US012587846B2

(12) United States Patent
Chen et al.

(10) Patent No.: US 12,587,846 B2
(45) Date of Patent: Mar. 24, 2026

(54) DEVICE, METHOD AND COMPUTER READABLE MEDIUM FOR RESISTING DOWNGRADE ATTACKS

(71) Applicant: Ruckus IP Holdings LLC, Claremont, NC (US)

(72) Inventors: Rui Chen, Shenzhen (CN); Lijie Niu, Shenzhen (CN); Linzhou Cai, Shenzhen (CN); Li Wang, Shenzhen (CN)

(73) Assignee: RUCKUS IP HOLDINGS LLC, Horsham, PA (US)

( * ) Notice: Subject to any disclaimer, the term of this patent is extended or adjusted under 35 U.S.C. 154(b) by 143 days.

(21) Appl. No.: 18/379,867

(22) Filed: Oct. 13, 2023

(65) Prior Publication Data

US 2024/0137760 A1     Apr. 25, 2024
US 2024/0236666 A9     Jul. 11, 2024

(30) Foreign Application Priority Data

Oct. 20, 2022    (CN) .......................... 202211285459.1

(51) Int. Cl.
*H04W 12/06*          (2021.01)
(52) U.S. Cl.
CPC ................................... *H04W 12/06* (2013.01)

(58) Field of Classification Search
CPC ........ H04W 12/08; H04W 12/06; H04L 9/16; H04L 9/32; H04L 9/002
See application file for complete search history.

(56) References Cited

U.S. PATENT DOCUMENTS

2021/0320935 A1* 10/2021 Berg .................... H04L 63/1416
2022/0338004 A1* 10/2022 Shibata ............... H04W 12/069
2023/0011936 A1*  1/2023 Tachibana ............ H04L 5/0096
2023/0308875 A1*  9/2023 Tian ..................... H04W 12/041
2024/0129320 A1*  4/2024 Bernsen ................ H04L 63/123

* cited by examiner

*Primary Examiner* — Alexander Lagor
*Assistant Examiner* — Lydia L Noel
(74) *Attorney, Agent, or Firm* — Myers Bigel, P.A.

(57) ABSTRACT

A device and method and computer readable medium for resisting downgrade attacks. User equipment includes a memory having instructions stored thereon and a processor configured to execute the instructions stored on the memory to cause the user equipment to perform the following operations: determining a security authentication type when the user equipment is connected to a network device for the first time; and in response to determining that the security authentication type when the user equipment is connected to the network device for the first time is WPA3, applying the only-WPA3 rule; where the only-WPA3 rule only allows the user equipment to use WPA3 to access the network device, and refuses the user equipment to use other security authentication types with lower security than WPA3 to access the network device.

18 Claims, 6 Drawing Sheets

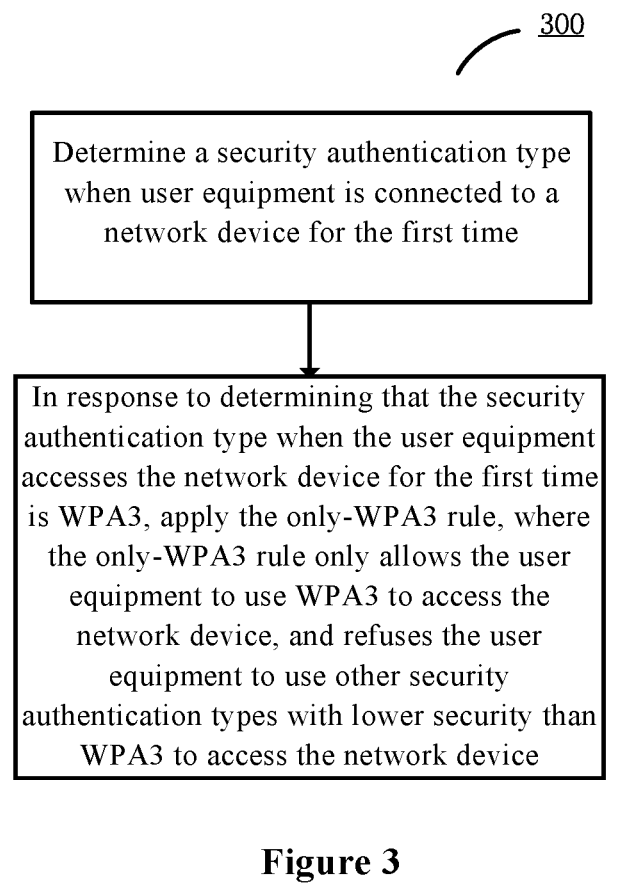

300

Determine a security authentication type when user equipment is connected to a network device for the first time In response to determining that the security authentication type when the user equipment accesses the network device for the first time is WPA3, apply the only-WPA3 rule, where the only-WPA3 rule only allows the user equipment to use WPA3 to access the network device, and refuses the user equipment to use other security authentication types with lower security than WPA3 to access the network device

Figure 3

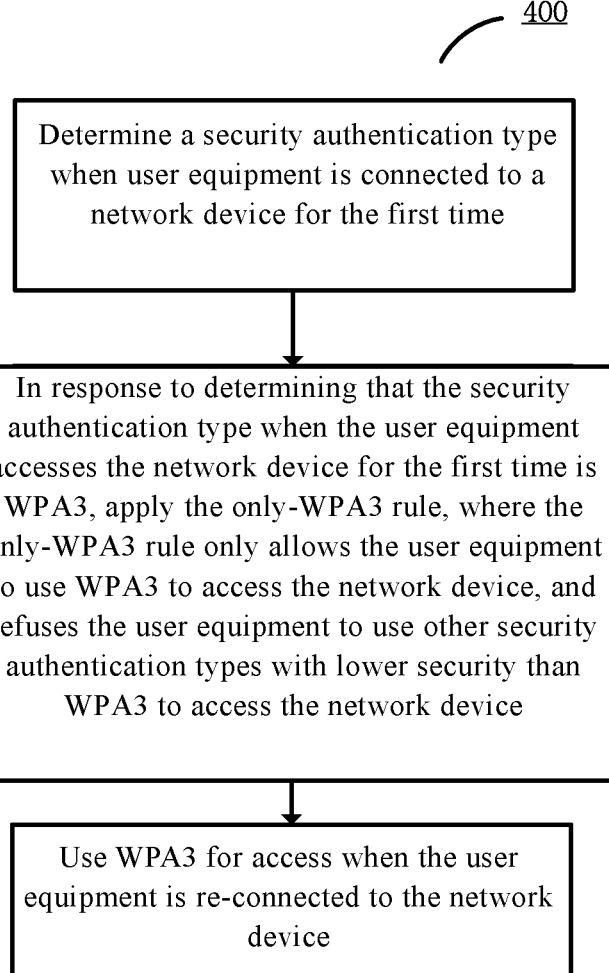

400

Determine a security authentication type when user equipment is connected to a network device for the first time In response to determining that the security authentication type when the user equipment accesses the network device for the first time is WPA3, apply the only-WPA3 rule, where the only-WPA3 rule only allows the user equipment to use WPA3 to access the network device, and refuses the user equipment to use other security authentication types with lower security than WPA3 to access the network device Use WPA3 for access when the user equipment is re-connected to the network device

Figure 4

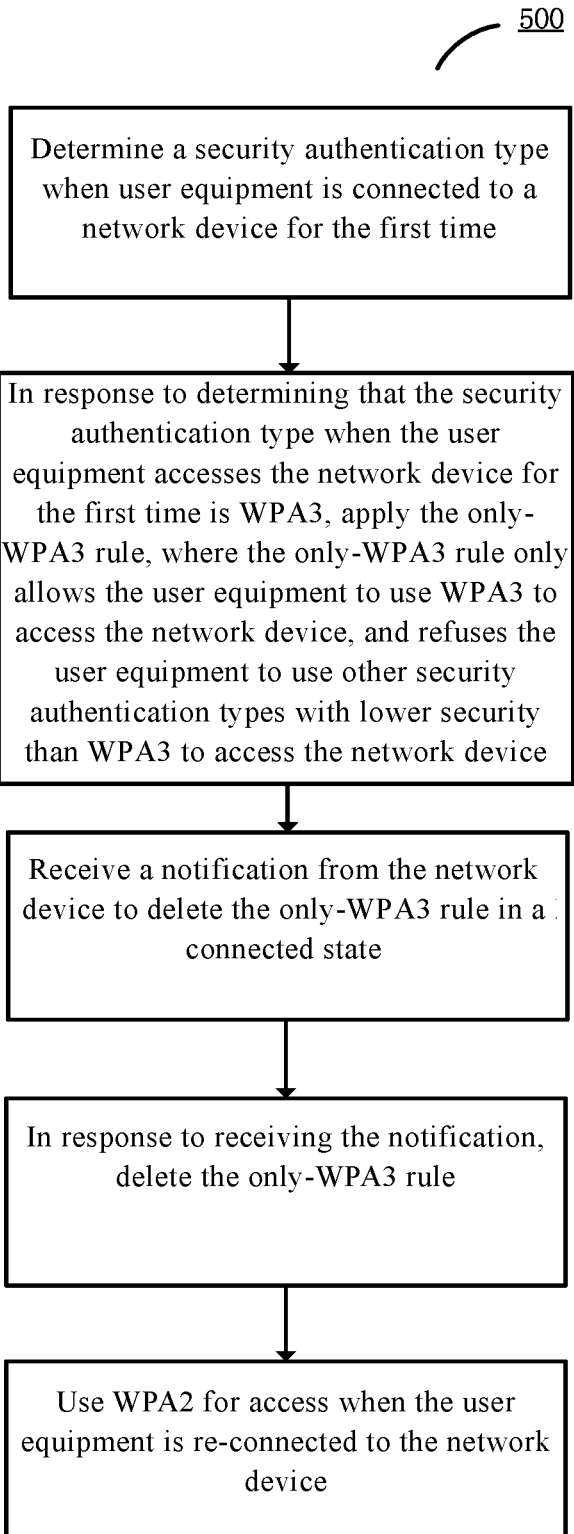

500

Determine a security authentication type when user equipment is connected to a network device for the first time In response to determining that the security authentication type when the user equipment accesses the network device for the first time is WPA3, apply the only-WPA3 rule, where the only-WPA3 rule only allows the user equipment to use WPA3 to access the network device, and refuses the user equipment to use other security authentication types with lower security than WPA3 to access the network device Receive a notification from the network device to delete the only-WPA3 rule in a connected state In response to receiving the notification, delete the only-WPA3 rule Use WPA2 for access when the user equipment is re-connected to the network device

Figure 5

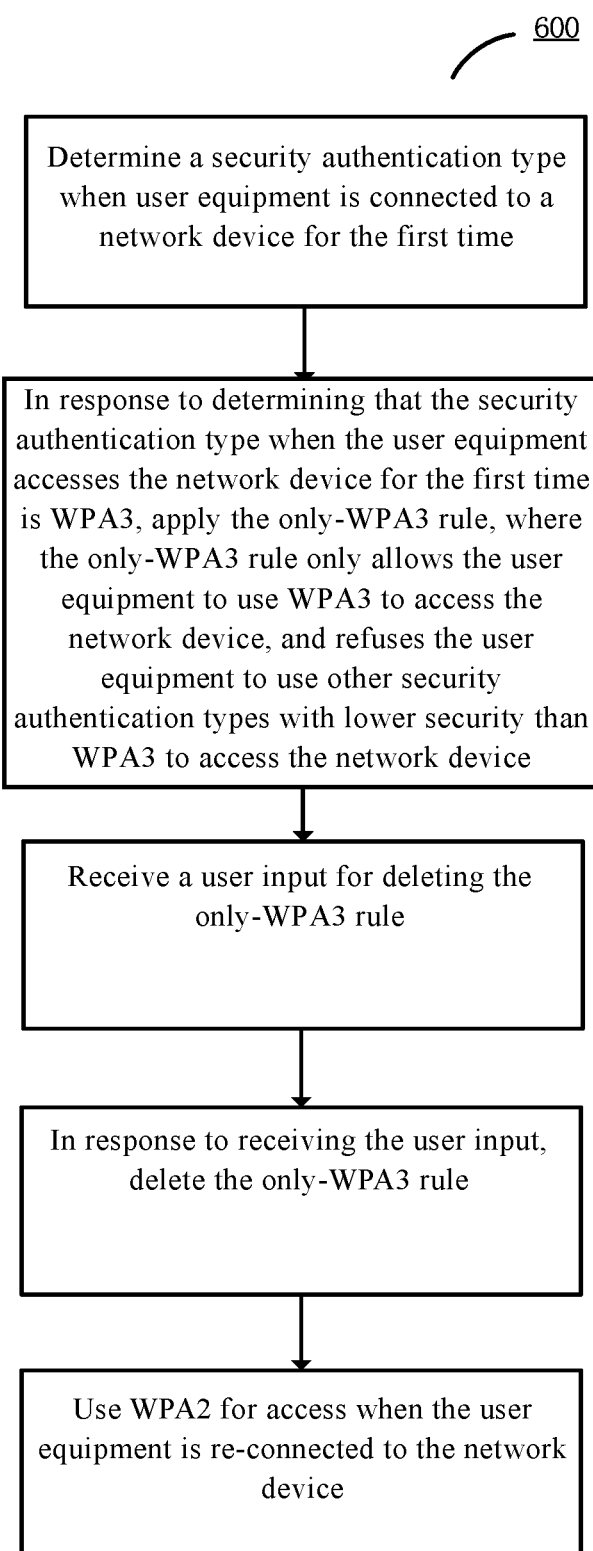

_600_

Determine a security authentication type when user equipment is connected to a network device for the first time In response to determining that the security authentication type when the user equipment accesses the network device for the first time is WPA3, apply the only-WPA3 rule, where the only-WPA3 rule only allows the user equipment to use WPA3 to access the network device, and refuses the user equipment to use other security authentication types with lower security than WPA3 to access the network device Receive a user input for deleting the only-WPA3 rule In response to receiving the user input, delete the only-WPA3 rule Use WPA2 for access when the user equipment is re-connected to the network device

Figure 6

DEVICE, METHOD AND COMPUTER READABLE MEDIUM FOR RESISTING DOWNGRADE ATTACKS

TECHNICAL FIELD

The present disclosure relates to wireless communication techniques, and more particularly, to a device and method for resisting downgrade attacks, a computer readable medium, and a computer program product.

BACKGROUND ART

In order to improve security of wireless network communication, industry groups such as the WIFI Alliance have developed a series of security authentication methods, such as WIFI Protected Access (WPA), WPA2 and WPA3. Users' needs for enhanced network security always exist.

SUMMARY OF THE INVENTION

The present disclosure relates to a device and method for resisting downgrade attacks, a computer readable medium, and a computer program product.

Some aspects of the present disclosure relate to user equipment, including a memory having instructions stored thereon and a processor configured to execute the instructions stored on the memory to cause the user equipment to perform the following operations: determining a security authentication type when the user equipment is connected to a network device for the first time; and in response to determining that the security authentication type when the user equipment is connected to the network device for the first time is WPA3, applying the only-WPA3 rule; where the only-WPA3 rule only allows the user equipment to use WPA3 to access the network device, and refuses the user equipment to use other security authentication types with lower security than WPA3 to access the network device.

In some embodiments, for the user equipment, the network device is in WPA3 transition mode, and the WPA3 transition mode allows WPA3-enabled user equipment to use WPA3 to access the network device, and also allows WPA2-enabled user equipment to use WPA2 to access the network device.

In some embodiments, for the user equipment, the other security authentication types include at least one of wired equivalent privacy (WEP), WPA, or WPA2.

In some embodiments, for the user equipment, the processor is further configured to execute the instructions stored on the memory to cause the user equipment to perform the following operation: in the case of applying the only-WPA3 rule, when the user equipment is re-connected to the network device, using WPA3 for access.

In some embodiments, for the user equipment, when the network device becomes in WPA2 mode, the processor is further configured to execute the instructions stored on the memory to cause the user equipment to perform the following operations: receiving a notification from the network device to delete the only-WPA3 rule in a connected state; and in response to receiving the notification, deleting the only-WPA3 rule.

In some embodiments, for the user equipment, when the network device becomes in WPA2 mode, the processor is further configured to execute the instructions stored on the memory to cause the user equipment to perform the following operations: receiving a user input for deleting the only-WPA3 rule; and in response to receiving the user input, deleting the only-WPA3 rule.

In some embodiments, for the user equipment, the processor is further configured to execute the instructions stored on the memory to cause the user equipment to perform the following operation: in the case of deleting the only-WPA3 rule, when the user equipment is re-connected to the network device, using WPA2 for access.

In some embodiments, for the user equipment the processor is further configured to execute the instructions stored on the memory to cause the user equipment to perform the following operation: determining an SSID and a MAC address of the network device upon accessing the network device for the first time, so as to identify the network device.

Other aspects of the present disclosure relate to a method performed by a network device, where the method includes: determining a security authentication type when the user equipment is connected to a network device for the first time; and in response to determining that the security authentication type when the user equipment is connected to the network device for the first time is WPA3, applying the only-WPA3 rule; where the only-WPA3 rule only allows the user equipment to use WPA3 to access the network device, and refuses the user equipment to use other security authentication types with lower security than WPA3 to access the network device.

In some embodiments, in the above method the network device is in WPA3 transition mode, and the WPA3 transition mode allows WPA3-enabled user equipment to use WPA3 to access the network device, and also allows WPA2-enabled user equipment to use WPA2 to access the network device.

In some embodiments, in the above method the other security authentication types include at least one of WEP, WPA, or WPA2.

In some embodiments, for the above method, in the case of applying the only-WPA3 rule, when the user equipment is re-connected to the network device, using WPA3 for access.

In some embodiments, for the above method, when the network device becomes in WPA2 mode, the method further includes: receiving a notification from the network device to delete the only-WPA3 rule in a connected state; and in response to receiving the notification, deleting the only-WPA3 rule.

In some embodiments, for the above method, when the network device becomes in WPA2 mode, the method further includes: receiving a user input for deleting the only-WPA3 rule; and in response to receiving the user input, deleting the only-WPA3 rule.

In some embodiments, the above method further includes: in the case of deleting the only-WPA3 rule, when the user equipment is re-connected to the network device, using WPA2 for access.

Other aspects of the present disclosure relate to a non-transitory computer-readable medium having instructions stored thereon, which, when executed by a processor of user equipment, cause the user equipment to perform the following operations: determining a security authentication type when the user equipment is connected to a network device for the first time; and in response to determining that the security authentication type when the user equipment is connected to the network device for the first time is WPA3, applying the only-WPA3 rule; where the only-WPA3 rule only allows the user equipment to use WPA3 to access the network device, and refuses the user equipment to use other security authentication types with lower security than WPA3 to access the network device.

In some embodiments, for the non-transitory computer-readable medium, the network device is in WPA3 transition mode, and the WPA3 transition mode allows WPA3-enabled user equipment to use WPA3 to access the network device, and also allows WPA2-enabled user equipment to use WPA2 to access the network device.

In some embodiments, for the non-transitory computer-readable medium, the other security authentication types include at least one of WEP, WPA, or WPA2.

In some embodiments, for the non-transitory computer-readable medium, when the network device becomes in WPA2 mode, the non-transitory computer-readable medium further includes instructions that, when executed by the processor of the user equipment, cause the user equipment to perform the following operations: receiving a notification from the network device to delete the only-WPA3 rule in a connected state; in response to receiving the notification, deleting the only-WPA3 rule; and using WPA2 to access the network device.

In some embodiments, for the non-transitory computer-readable medium, when the network device becomes in WPA2 mode, the non-transitory computer-readable medium further includes instructions that, when executed by the processor of the user equipment, cause the user equipment to perform the following operations: receiving a user input for deleting the only-WPA3 rule; in response to receiving the user input, deleting the only-WPA3 rule; and using WPA2 to access the network device.

Some other aspects of the present disclosure relate to a computer program product including instructions that, when executed by one or more processors, cause the execution of the method described above.

BRIEF DESCRIPTION OF THE ATTACHED DRAWINGS

In order to better understand the present disclosure and show how to implement, description will now be made by way of examples with reference to the accompanying drawings, noting that similar reference numerals refer to the corresponding parts throughout the drawings. In which:

FIG. 3 is a schematic diagram of an exemplary method executed by user equipment according to an embodiment of the present disclosure;

FIG. 4 is a schematic diagram of another exemplary method executed by user equipment according to an embodiment of the present disclosure;

FIG. 5 is a schematic diagram of still another exemplary method executed by user equipment according to an embodiment of the present disclosure; and FIG. 6 is a schematic diagram of yet another exemplary method executed by user equipment according to an embodiment of the present disclosure.

SPECIFIC EMBODIMENTS

Figure 1:
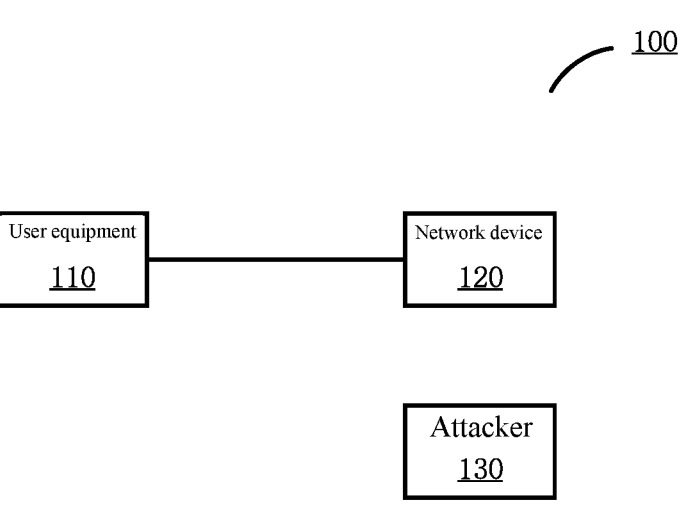
FIG. 1 is a schematic diagram showing an example system environment according to an embodiment of the present disclosure.

The following detailed description is made with reference to the attached drawings, and the following detailed description is provided to facilitate comprehensive understanding of various exemplary embodiments of the present disclosure.

The following description includes various details for facilitation of understanding. However, these details are merely considered as examples, not for limiting the present disclosure. The present disclosure is defined by the attached Claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

As mentioned previously, users' need for enhanced network security always exist. In order to improve the security of wireless network communication, security authentication methods are constantly being enhanced, such as from WEP to WPA, WPA2, and WPA3.

The WIFI Alliance introduced WPA in 2003 to replace WEP with obvious vulnerabilities, and adopted the more secure temporal key integrity protocol (TKIP) as the encryption standard in WPA. Subsequently, the WIFI Alliance proposed WPA2 in 2006, using the advanced encryption standard (AES) algorithm and counter mode with cbc-mac protocol (CCMP) as the encryption standard, of which CCMP significantly improved the security of TKIP. However, WPA2 has also recently exposed some new security vulnerabilities, for example, hackers can crack WPA2 encryption through offline dictionary attacks, PIN codes, Krack attacks, and other cracking methods.

WPA3 proposed by the WIFI Alliance in 2018 can effectively solve and avoid dictionary attacks and other problems. Compared to WPA2, WPA3 uses Simultaneous Authentication of Equals (SAE) or dragonfly key exchange. SAE improves security of initial key exchange and provides better protection against offline dictionary attacks.

However, because there are still many older user equipment that does not currently support WPA3, WPA3 transition mode is still needed during the promotion and application period of WPA3. In addition to allowing WPA3-enabled user equipment to use WPA3 to access a network device, WPA3 transition mode also allow WPA2-enabled user equipment to use WPA2 to access the network device.

However, for WPA3 transition mode, there may be dictionary attacks caused by degradation attacks, which still expose user equipment to network insecurity issues. For example, if a client in WPA3 transition mode is connected to an access point (AP) in WPA3 transition mode, authentication between them is actually WPA3 SAE. However, if a hacker attacker creates an illegal access point with the same network name service set identifier (SSID) and modifies a beacon to deceive a client, so that the client believes that this AP only supports WPA2, the client will use WPA2 and the same WIFI password used to connect to the real AP before negotiating with the illegal access point. The client will use the message integrity code (MIC) calculated from the WIFI password to generate a second handshake message packet. Then, the attacker obtains the second handshake message packet, so that the attacker can carry out dictionary attacks, that is, use various passwords in the dictionary to continuously verify the MIC for brute force attacks. Ultimately, in a reasonable amount of time, the attacker could crack and obtain the correct WIFI password to access the user's network.

Therefore, although WPA3 was originally able to resist dictionary attacks after it was adopted, this attack may occur again due to introduction of WPA3 transition mode. At this stage, WPA3 transition mode is still necessary to some extent, or is enabled by default. Therefore, there is a need to mitigate impact of a downgrade attack against WPA3 transition mode.

Therefore, the present disclosure seeks user equipment, a method, and a system that resist downgrade attacks against WPA3 transition mode in order to further enhance network security and improve user experience. By determining a security authentication type when user equipment accesses a network device for the first time; and in response to determining that the security authentication type when the user equipment accesses the network device for the first time is WPA3, only the WPA3 rule is applied, and the WPA3 rule only allows the user equipment to access the network device using WPA3 only, and refuses the user equipment from using other security authentication types with lower security than WPA3 to access the network device, which can effectively resist downgrade attacks against WPA3 transition mode.

FIG. 1 is a schematic diagram showing an example system environment according to an embodiment of the present disclosure.

Referring to FIG. 1, the example system environment may include user equipment 110, a network device 120, etc. Furthermore, FIG. 1 also illustrates an attacker 130. Although FIG. 1 only shows one user equipment and one network device, the present disclosure may include a plurality of user equipment or a plurality of network devices, and the number of which is not limited.

In some embodiments, the user equipment 110 may be a variety of client devices, such as a set top box (STB), an extender with a backhaul mode, a WIFI router that acts as a WIFI client allowed to access a hotspot of a mobile device, and so on. The user equipment 110 may access the network device 120 and receive various types of communication and/or send various types of communication to the network device 120 from the network device 120 for various types of communication. For example, the user equipment 110 may receive one or more data services, one or more audio/video services, and/or other services from the network through the network device 120, and send various types of data to the network device 120. Note that the present disclosure does not specifically limit the type of the user equipment 110.

The network device 120 may be various types of network devices connecting the user equipment 110 to the network, and may be, for example, an access point, a transceiver, a controller, a radio node, a router, a switch, a communication device, and/or another electronic device. Note: The present disclosure does not specifically limit the type of the network device 120.

The attacker 130 may be a party intending to deceive the user equipment 110 to access the user network to implement an attack, which may include an illegal access point.

Figure 2:
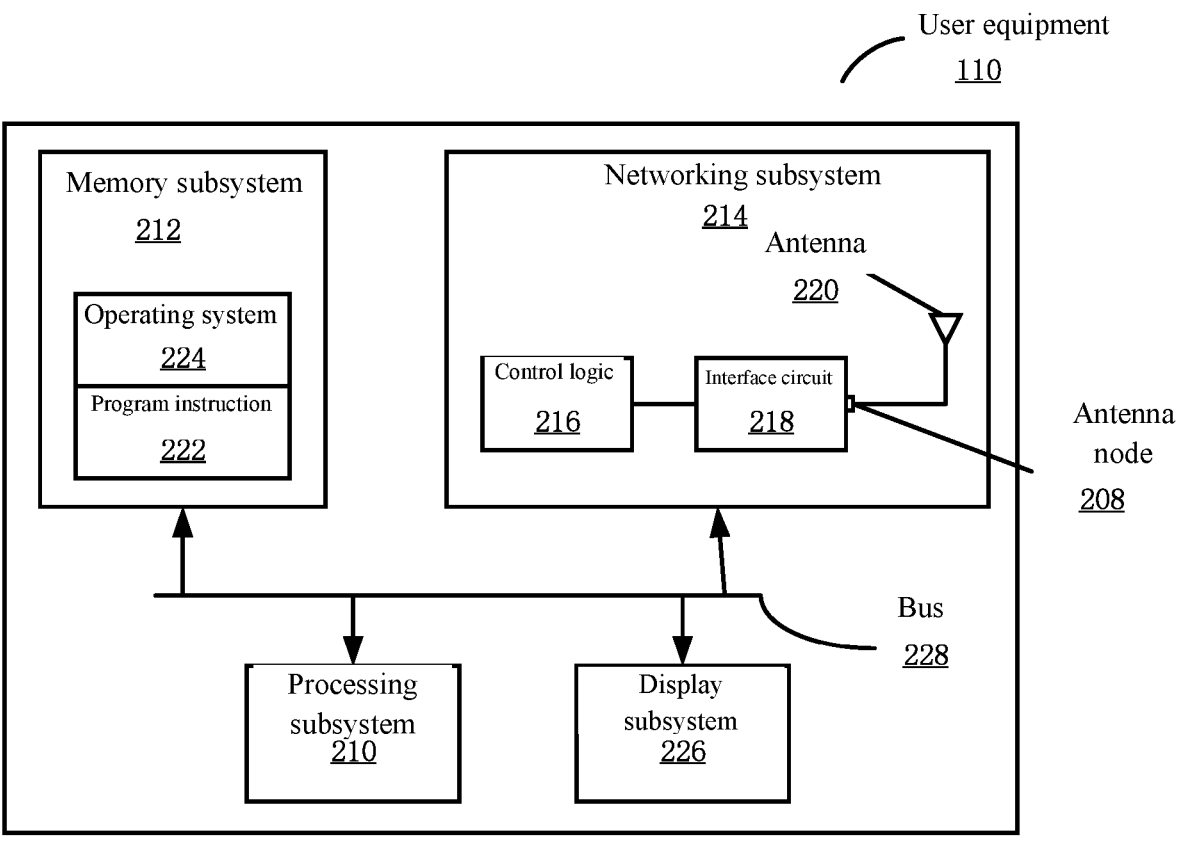
FIG. 2 is a schematic diagram showing user equipment according to an embodiment of the present disclosure.

Now, with reference to FIG. 2, we will describe an embodiment of user equipment (referred to herein as the user equipment 110), which can perform at least some operations according to an embodiment of the present disclosure in communication technology. The user equipment 110 may include a processing subsystem 210, a memory subsystem 212, and a networking subsystem 214.

The processing subsystem 210 includes one or a plurality of devices configured to perform computing operations. The processing subsystem 210 provides various functions of the user equipment 110. In some embodiments, the processing subsystem 210 is configured to perform operations for video content processing. For example, the processing subsystem 210 may include one or a plurality of microprocessors, ASICs, microcontrollers, programmable logic devices, Graphic Processing Units (GPU), and/or one or a plurality of Digital Signal Processors (DSP). The processing subsystem 210 may execute various program instructions stored in the memory subsystem 212 to perform corresponding operations, for example, to execute various program instructions to realize the methods shown in FIG. 3 to FIG. 6.

The memory subsystem 212 includes one or a plurality of devices for storing data and/or instructions used for the processing subsystem 210 and the networking subsystem 214. For example, the memory subsystem 212 may include a dynamic random-access memory (DRAM), a static random-access memory (SRAM), and/or other types of memory (sometimes collectively or individually referred to as "computer-readable storage medium"). In some embodiments, the instructions used in the memory subsystem 212 of the processing subsystem 210 include: one or a plurality of program modules or instruction sets (for example, a program instruction 222 or an operating system 224), which can be executed by the processing subsystem 210. It should be noted that one or a plurality of computer programs may constitute a computer program mechanism. In addition, an instruction in the various modules of the memory subsystem 212 may be implemented by the following: advanced programming languages, object-oriented programming languages and/or assembly or machine languages. Moreover, the programming language may be compiled or interpreted, e.g., as configurable or configured (used interchangeably in this discussion), for executing by the processing subsystem 210 to realize the functions of the present disclosure.

In addition, the memory subsystem 212 may include mechanism for controlling access to memory. In some embodiments, the memory subsystem 212 includes a memory hierarchy, and the memory hierarchy includes one or a plurality of high-speed caches coupled to the memory in the user equipment 110. In some of these embodiments, one or a plurality of the high-speed caches are located in the processing subsystem 210.

In some embodiments, the memory subsystem 212 is coupled to one or a plurality of high-capacity mass storage devices (not shown). For example, the memory subsystem 212 may be coupled to a magnetic or optical driver, a solid-state driver, or another type of mass storage device. In these embodiments, the user equipment 110 may use the memory subsystem 212 as a fast-access storage of frequently used data, while the mass storage device may be used to store infrequently used data.

The networking subsystem 214 includes one or a plurality of devices configured to be coupled to a wired and/or wireless network and to communicate over the wired and/or wireless network (i.e., to perform network operations), including: control logic 216, an interface circuit 218, and one or a plurality of antennas 220 (or antenna elements). (Although FIG. 2 includes one or a plurality of antennas 220, in some embodiments, the user equipment 110 includes one or a plurality of nodes that can be coupled to one or a plurality of antennas 220, such as a node 208. Therefore, the user equipment 110 may include or not include one or a plurality of antennas 220.) For example, the networking subsystem 214 may include a Bluetooth networking system, a cellular networking system (for example, 3G/4G/5G networks, such as UMTS and LTE), a USB networking system, a networking system based on standards described in IEEE 802.11 (for example, Wi-Fi networking system), Ethernet networking system, and/or another networking system.

Within the user equipment 110, the processing subsystem 210, memory subsystem 212 and networking subsystem 214 are coupled together by using a bus 228. The bus 228 may include electrical, optical, and/or electro-optical connections of the subsystems through which commands, data and the like may be transmitted. Although only one bus 228 is shown for clarity, different embodiments may include different numbers or configurations of electrical, optical, and/or electro-optical connections in the subsystems.

In some embodiments, the user equipment 110 includes a display subsystem 226 for displaying information on a display device, which may include a display driver and a display, such as a liquid crystal display and a multi-touch screen, etc.

The user equipment 110 may be (or may be included in) any electronic device having at least one network interface capable of connecting the network device 120 with an external signal source. For example, the user equipment 110 may be (or may be included in): an STB, an on-board box, an integrated box, a smart box, a smart TV, an Internet TV, a desktop computer, a laptop computer, a sub-notebook/ netbook, a server, a computer, a mainframe computer, a cloud-based computer, a tablet computer, a smart phone, a cellular phone, a smart watch, a wearable device, a consumer electronic device, a portable computing device, an access point, a transceiver, a controller, a radio node, a router, a switch, a communication device, a test device, and/or other electronic devices.

Although specific components are used to describe the user equipment 110, in alternative embodiments, different components and/or subsystems may exist in the user equipment 110. For example, the user equipment 110 may include one or a plurality of additional processing subsystems, memory subsystems, networking subsystems, and/or display subsystems. In addition, the user equipment 110 may not have one or a plurality of subsystems. Furthermore, in some embodiments, the user equipment 110 may include one or more additional subsystems not shown in FIG. 2. Also, although separate subsystems are shown in FIG. 2, in some embodiments, some or all of the given subsystems or components may be integrated into one or a plurality of the other subsystems or components in the user equipment 110. For example, in some embodiments, the program instruction 222 is incorporated in the operating system 224, and/or the control logic 216 is incorporated in the interface circuit 218.

Although Wi-Fi and/or Ethernet communication protocols are used in the above discussion as illustrative examples, in other embodiments, various communication protocols may be used, and more generally, communication technologies may be used. Therefore, communication technologies can be used in various network interfaces. In addition, although some operations in the aforementioned embodiments are implemented by hardware or software, in general, the operations in the aforementioned embodiments may be implemented in various configurations and frameworks. Therefore, some or all of the operations in the aforementioned embodiments may be implemented by hardware, software, or both. For example, at least some operations in the communication technology can be implemented using the program instruction 222, the operating system 224 (e.g., a driver for the interface circuit 218), or firmware in the interface circuit 218. Alternatively or in addition, at least some operations in the communication technology may be implemented at physical layer, e.g., hardware in the interface circuit 218.

FIG. 3 is a schematic diagram of an exemplary method 300 executed by user equipment 110 according to an embodiment of the present disclosure. In combination with the system environment 100 shown in FIG. 1, the user equipment 110 executing the method 300 may operate with the network device 120.

The method 300 may include an operation 301: determining a security authentication type when the user equipment 110 is connected to the network device 120 for the first time. For example, when the user equipment 110 is connected to the network device 120 for the first time, it is determined whether the security authentication type is WPA3, WPA2, or others. In addition, when connecting to the network device 120 for the first time, the method 300 also determines an SSID and a MAC address of the network device 120 to identify the network device 120, so as to determine whether it is the same network device based on the SSID and MAC address when connecting to the network device again.

In the method 300, the network device 120 is in WPA3 transition mode, and the WPA3 transition mode allows WPA3-enabled user equipment to use WPA3 to access the network device, and also allows WPA2-enabled user equipment to use WPA2 to access the network device. In some embodiments, the user equipment 110 may also support WPA3 transition mode, i.e. WPA2 may be used or WPA3 may be used to access a corresponding network device.

The method 300 continuously includes an operation 302: in response to determining that the security authentication type when the user equipment 110 accesses the network device 120 for the first time is WPA3, the user equipment 110 can apply the only-WPA3 rule. The only-WPA3 rule only allows the user equipment 110 to use WPA3 to access the network device 120, and refuses the user equipment 110 to use other security authentication types with lower security than WPA3 to access the network device 120. The other security authentication types may, for example, be WPA2, or may, for example, include at least one of WEP, WPA, or WPA2.

FIG. 4 is a schematic diagram of another exemplary method 400 executed by user equipment 110 according to an embodiment of the present disclosure. Operations 401-402 are similar to operations 301-302 of the method 300 and thus are not repeated herein.

The method 400 further includes an operation 403: in the case of applying the only-WPA3 rule, using WPA3 to access the network device 120 when the user equipment 110 is re-connected to the network device 120. Herein, it can be determined whether the same network device 120 is re-accessed according to whether the SSID and MAC address are matched.

Generally, a user will hardly switch the network device 120 from WPA3 mode to WPA2 mode, or from WPA3 transition mode to WPA2 only mode. This change is largely more like a hacker trying to perform a downgrade attack. Therefore, in the method 300 and the method 400, the user equipment that uses WPA3 to access the network device for the first time subsequently uses only WPA3 for re-access, which will have little impact on the user, and can effectively protect the user equipment from downgrade attacks while ensuring the connection.

However, there are still some cases where the user needs to change the network device to WPA2 mode, or the user does change the network device to WPA2 mode for various reasons. Further operations of embodiments of the present disclosure in this case will be described later in connection with FIGS. 5-6.

FIG. 5 is a schematic diagram of still another exemplary method 500 executed by user equipment 110 according to an embodiment of the present disclosure. The method 500 may assume that the network device 120 can realize the function of sending a corresponding notification to the user equipment. Operations 501-502 are similar to operations 301-302 of the method 300 and thus are not repeated herein.

The method 500 includes an operation 503: receiving a notification from the network device 120 to delete the only-WPA3 rule in a connected state. As the user equipment 110 and the network device 120 are currently in the connected state, when the network device is changed to WPA2 mode, the user equipment can be made aware of the change in a timely manner by sending a notification in the connected state. It is also difficult for attackers to take advantage of the fact that both parties are in the connected state and have a short operating time.

The method 500 continuously includes an operation 504: in response to receiving the notification, deleting the only-WPA3 rule.

Then, in an operation 505, in the case of deleting the only-WPA3 rule, when the user equipment 110 is connected to the network device 120 again, WPA2 is used to access the network device 120.

For example, for an extender with a backhaul connected to an access point, if the access point changes from WPA3 mode or WPA3 transition mode to WPA2 mode, the access point may send a notification to the extender. The extender that receives the notification can delete the only-WPA3 rule, so that the access point can be accessed through WPA2.

For another example, for an STB connected to the access point, the notification function may be implemented on the access point, so that if the access point changes from WPA3 mode or WPA3 transition mode to WPA2 mode, the access point sends a notification to the STB so that the STB deletes the only-WPA3 rule.

For another example, for a WIFI router, connected to a hotspot of a mobile device, that acts as a client, the mobile device may send a notification to the WIFI router that acts as a client when the mobile device becomes WPA2 mode to notify the client to delete the rule.

FIG. 6 is a schematic diagram of yet another exemplary method 600 executed by user equipment 110 according to an embodiment of the present disclosure. As compared to the method 500, the method 600 may also be suitable for situations where the network device 120 is unable to realize the function of sending a corresponding notification to the user equipment. Operations 601-602 are similar to operations 301-302 of the method 300 and thus are not repeated herein.

The method 600 includes an operation 603: receiving a user input for deleting the only-WPA3 rule. When the network device is changed to WPA2 mode, the user may be required to operate the user equipment 110 so that the only-WPA3 rule is deleted.

For example, for an access point that does not support sending a corresponding notification to the STB, the user may be required to restart the STB to delete the only-WPA3 rule by initializing. In this case, the user can be guided by adding some information to perform the operation, such as adding prompt information on the page.

The method 600 continuously includes an operation 604: in response to receiving the user input, deleting the only-WPA3 rule.

Then, in an operation 605, in the case of deleting the only-WPA3 rule, when the user equipment 110 is connected to the network device 120 again, WPA2 is used to access the network device 120.

Through the above operations, even if the network device changes to WPA2 mode, the embodiments of the present disclosure enable the user equipment to still access the network device, which is not affected by downgrade attacks during the switching process, thereby ensuring user experience and network security.

The present disclosure may be realized as any combination of devices, systems, integrated circuits, and computer programs on non-transitory computer-readable media. One or a plurality of processors may be realized as an integrated circuit (IC), an application-specific integrated circuit (ASIC) or a large-scale integrated circuit (LSI), a system LSI, a super LSI, or an ultra LSI component that performs some or all of the functions described in the present disclosure.

The present disclosure includes the use of software, applications, computer programs, or algorithms. Software, application programs, computer programs or algorithms can be stored on a non-transient computer-readable medium, so that a computer with one or a plurality of processors can execute the aforementioned steps and the steps described in the attached drawings. For example, one or a plurality of memories store software or algorithms by executable instructions, and one or a plurality of processors can associate the execution of a set of instructions of the software or algorithms to provide monitoring in any number of wireless networks according to the embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may comprise dynamic random access memory (DRAM), random access memory (RAM), read-only memory (ROM), electrically erasable programmable read-only memory (EE-PROM), compact disk read-only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include Compact Discs (CDs), laser disks, optical disks, Digital Versatile Discs (DVDs), floppy disks, and Blu-ray disks, wherein magnetic disks usually copy data magnetically, and disks copy data optically via laser. Combinations of the above are also included in the scope of computer-readable media.

In one or a plurality of embodiments, the use of the words "may", "able", "operable as" or "configured as" refers to some devices, logics, hardware and/or elements designed to be used in a specified manner. The subject matter of the present disclosure is provided as an example of the apparatus, system, method, and program for performing the features described in the present disclosure. However, in addition to the above features, other features or modifications can be expected. It can be expected that any emerging technology that may replace any of the aforementioned realization technologies may be used to complete the realization of the components and functions of the present disclosure.

In addition, the above description provides examples without limiting the scope, applicability, or configuration set forth in the claims. Without departing from the spirit and scope of the present disclosure, changes may be made to the functions and layouts of the discussed elements. Various embodiments may omit, substitute, or add various processes or components as appropriate. For example, features described with respect to some embodiments may be combined in other embodiments.

Similarly, although operations are depicted in a specific order in the attached drawings, this should not be understood as a requirement that such operations should be executed in the specific order shown or in the sequential order, or that all illustrated operations should be executed to realize the desired result. In some cases, multi-tasking and parallel processing may be advantageous.

The invention claimed is:

1. User equipment, comprising:

a memory having instructions stored thereon;

a processor configured to execute the instructions stored on the memory to cause the user equipment to carry out the following operations:

determining a security authentication type when the user equipment accesses a network device for a first time;

in response to determining that the security authentication type when the user equipment accesses the network device for the first time is WIFI Protected Access 3 (WPA3), applying an only-WPA3 rule;

determining if the user equipment is in a connected state;

when the network device is determined to be in a WIFI Protected Access 2 (WPA2) mode, receiving a notification from the network device to delete the only-WPA3 rule while the user equipment is in the connected state; and in response to receiving the notification, deleting the only-WPA3 rule, wherein the only-WPA3 rule only allows the user equipment to use WPA3 to access the network device, and does not allow the user equipment to use other security authentication types with lower security than WPA3 to access the network device.

2. The user equipment according to claim 1, wherein the network device is in WPA3 transition mode, and the WPA3 transition mode allows WPA3-enabled user equipment to use WPA3 to access the network device, and also allows WPA2-enabled user equipment to use WPA2 to access the network device.

3. The user equipment according to claim 1, wherein the other security authentication types comprise at least one of wired equivalent privacy (WEP), WIFI Protected Access (WPA), or WIFI Protected Access 2 (WPA2).

4. The user equipment according to claim 1, wherein the processor is further configured to execute the instructions stored on the memory to cause the user equipment to perform the following operation:

in a case of applying the only-WPA3 rule, when the user equipment is re-connected to the network device, using WPA3 for access.

5. The user equipment according to claim 1, wherein when the network device becomes in WPA2 mode, the processor is further configured to execute the instructions stored on the memory to cause the user equipment to perform the following operations:

receiving a user input for deleting the only-WPA3 rule; and in response to receiving the user input, deleting the only-WPA3 rule.

6. The user equipment according to claim 1, wherein when the network device becomes in WPA2 mode, the processor is further configured to execute the instructions stored on the memory to cause the user equipment to perform one or more following operations:

receiving a notification from the network device to delete the only-WPA3 rule in the connected state, in response to receiving the notification, deleting the only-WPA3 rule, and in a case of deleting the only-WPA3 rule, when the user equipment is re-connected to the network device, using WPA2 for access; and receiving a notification from the network device to delete the only-WPA3 rule in the connected state, in response to receiving user input, deleting the only-WPA3 rule, and in the case of deleting the only-WPA3 rule, when the user equipment is re-connected to the network device, using WPA2 for access.

7. The user equipment according to claim 1, wherein the processor is further configured to execute the instructions stored on the memory to cause the user equipment to perform the following operation:

determining a service set identifier (SSID) and a medium access control (MAC) address of the network device upon accessing the network device for the first time, so as to identify the network device.

8. A method executed by user equipment, wherein the method comprises:

determining a security authentication type when the user equipment is connected to a network device for a first time; and in response to determining that the security authentication type when the user equipment is connected to the network device for the first time is WIFI Protected Access 3 (WPA3), applying an only-WPA3 rule, wherein the only-WPA3 rule only allows the user equipment to use WPA3 to access the network device, and does not allow the user equipment to use other security authentication types with lower security than WPA3 to access the network device, and wherein when the network device becomes in WPA2 mode and upon determining that the user equipment is in a connected state, the method further comprises any one or more of:

receiving a notification from the network device to delete the only-WPA3 rule in the connected state and, in response to receiving the notification, deleting the only-WPA3 rule, and when the user equipment is re-connected to the network device after deleting the only-WPA3 rule, using WPA2 for access; and receiving a notification from the network device to delete the only-WPA3 rule in the connected state and, in response to receiving user input, deleting the only-WPA3 rule, and, when the user equipment is re-connected to the network device after deleting the only-WPA3 rule, using WPA2 for access.

9. The method according to claim 8, wherein the network device is in WPA3 transition mode, and the WPA3 transition mode allows WPA3-enabled user equipment to use WPA3 to access the network device, and also allows WIFI Protected Access 2 (WPA2)-enabled user equipment to use WPA2 to access the network device.

10. The method according to claim 8, wherein the other security authentication types comprise at least one of wired equivalent privacy (WEP), WIFI Protected Access (WPA), or WIFI Protected Access 2 (WPA2).

11. The method according to claim 8, further comprising:

in a case of applying the only-WPA3 rule, when the user equipment is re-connected to the network device, using WPA3 for access.

12. The method according to claim 8, wherein when the network device becomes in WPA2 mode, the method further comprises:

receiving a notification from the network device to delete the only-WPA3 rule in the connected state; and in response to receiving the notification, deleting the only-WPA3 rule.

13. The method according to claim 8, wherein when the network device becomes in WPA2 mode, the method further comprises:

receiving a user input for deleting the only-WPA3 rule; and in response to receiving the user input, deleting the only-WPA3 rule.

14. A non-transitory computer-readable medium having instructions stored thereon that, when executed by a processor of user equipment, cause the user equipment to perform the following operations:

determining a security authentication type when the user equipment is connected to a network device for a first time; and in response to determining that the security authentication type when the user equipment is connected to the network device for the first time is WIFI Protected Access 3 (WPA3), applying an only-WPA3 rule;

determining if the user equipment is in a connected state;

when the network device is determined to be in a WIFI Protected Access 2 (WPA2) mode, receiving a notification from the network device to delete the only-WPA3 rule while the user equipment is in the connected state; and in response to receiving the notification, deleting the only-WPA3 rule, wherein the only-WPA3 rule only allows the user equipment to use WPA3 to access the network device, and does not allow the user equipment to use other security authentication types with lower security than WPA3 to access the network device.

15. The non-transitory computer-readable medium according to claim 14, wherein the network device is in WPA3 transition mode, and the WPA3 transition mode allows WPA3-enabled user equipment to use WPA3 to access the network device, and also allows WIFI Protected Access 2 (WPA2)-enabled user equipment to use WPA2 to access the network device.

16. The non-transitory computer-readable medium according to claim 14, wherein the other security authentication types comprise at least one of wired equivalent privacy (WEP), WIFI Protected Access (WPA), or WIFI Protected Access 2 (WPA2).

17. The non-transitory computer-readable medium according to claim 14, wherein when the network device becomes in WPA2 mode, the non-transitory computer-readable medium further comprises instructions that, when executed by the processor of the user equipment, cause the user equipment to perform the following operations:

receiving a notification from the network device to delete the only-WPA3 rule in the connected state;

in response to receiving the notification, deleting the only-WPA3 rule; and using WPA2 to access the network device.

18. The non-transitory computer-readable medium according to claim 14, wherein when the network device becomes in WPA2 mode, the non-transitory computer-readable medium further comprises instructions that, when executed by the processor of the user equipment, cause the user equipment to perform the following operations:

receiving a user input for deleting the only-WPA3 rule;

in response to receiving the user input, deleting the only-WPA3 rule; and using WPA2 to access the network device.

* * * * *